US008646252B2

(12) United States Patent
Gibson et al.

(10) Patent No.: US 8,646,252 B2
(45) Date of Patent: Feb. 11, 2014

(54) PREVENTING CATALYST DAMAGE DURING MISFIRE EVENT

(75) Inventors: Bradley Gibson, Swartz Creek, MI (US); Andrew W. Baur, Flushing, MI (US)

(73) Assignee: GM Global Technology Operations LLC

(*) Notice: Subject to any disclaimer, the term of this patent is extended or adjusted under 35 U.S.C. 154(b) by 605 days.

(21) Appl. No.: 12/684,393

(22) Filed: Jan. 8, 2010

(65) Prior Publication Data

US 2011/0167797 A1 Jul. 14, 2011

(51) Int. Cl.
*F01N 3/00* (2006.01)

(52) U.S. Cl.
USPC ............................................ 60/274; 60/284

(58) Field of Classification Search
USPC .............. 60/274, 276, 277, 285; 73/114.69, 73/114.75
See application file for complete search history.

(56) References Cited

U.S. PATENT DOCUMENTS

| 5,268,086 | A | * | 12/1993 | Hamburg et al. | 204/429 |
|---|---|---|---|---|---|
| 5,661,974 | A | * | 9/1997 | Kitamura et al. | 60/285 |
| 5,832,721 | A | * | 11/1998 | Cullen | 60/274 |
| 5,956,941 | A | * | 9/1999 | Cullen et al. | 60/274 |
| 6,244,042 | B1 | * | 6/2001 | Dickers et al. | 60/274 |
| 6,691,507 | B1 | * | 2/2004 | Meyer et al. | 60/285 |
| 7,007,460 | B2 | * | 3/2006 | Frieden et al. | 60/284 |
| 2004/0206071 | A1 | * | 10/2004 | Glugla et al. | 60/285 |
| 2009/0133464 | A1 | * | 5/2009 | Sell et al. | 73/1.03 |
| 2009/0184105 | A1 | * | 7/2009 | Hasegawa | 219/497 |
| 2011/0023590 | A1 | * | 2/2011 | Van Nieuwstadt et al. | 73/114.73 |

FOREIGN PATENT DOCUMENTS

GB 2277594 * 11/1994 ............. F02D 41/06

* cited by examiner

*Primary Examiner* — Thomas Denion
*Assistant Examiner* — Matthew T Largi

(57) ABSTRACT

A control system includes a temperature determination module and a catalyst protection module. The temperature determination module determines a temperature of exhaust gas based on a resistance of a heating element of an oxygen sensor. The catalyst protection module adjusts an operating parameter of an engine to decrease the temperature of the exhaust gas when the temperature of the exhaust gas is greater than a threshold temperature. The threshold temperature is based on a temperature that damages a catalyst in an exhaust system.

21 Claims, 3 Drawing Sheets

PREVENTING CATALYST DAMAGE DURING MISFIRE EVENT

FIELD

The present disclosure relates to control systems and methods for determining exhaust temperature, and more particularly to control systems and methods for determining exhaust temperature using an oxygen sensor heating element.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle that includes an internal combustion engine may produce exhaust gas having varying concentrations of oxygen. The vehicle may include one or more oxygen sensors to monitor the oxygen concentration in the exhaust gas. Oxygen sensors typically include a sensor element and a heating element. The sensor element operates effectively after reaching an operating temperature (e.g., 650° C.).

An engine control module (ECM) may apply a voltage and/or current to the heating element to heat the sensor element to the operating temperature. The ECM determines that the heating element is at the operating temperature based on a resistance of the heating element. The ECM determines the resistance of the heating element based on the voltage and/or current applied to the heating element.

SUMMARY

A control system comprises a temperature determination module and a catalyst protection module. The temperature determination module determines a temperature of exhaust gas based on a resistance of a heating element of an oxygen sensor. The catalyst protection module adjusts an operating parameter of an engine to decrease the temperature of the exhaust gas when the temperature of the exhaust gas is greater than a threshold temperature. The threshold temperature is based on a temperature that damages a catalyst in an exhaust system.

A method comprises determining a temperature of exhaust gas based on a resistance of a heating element of an oxygen sensor. The method further comprises adjusting an operating parameter of an engine to decrease the temperature of the exhaust gas when the temperature of the exhaust gas is greater than a threshold temperature. The threshold temperature is based on a temperature that damages a catalyst in an exhaust system.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
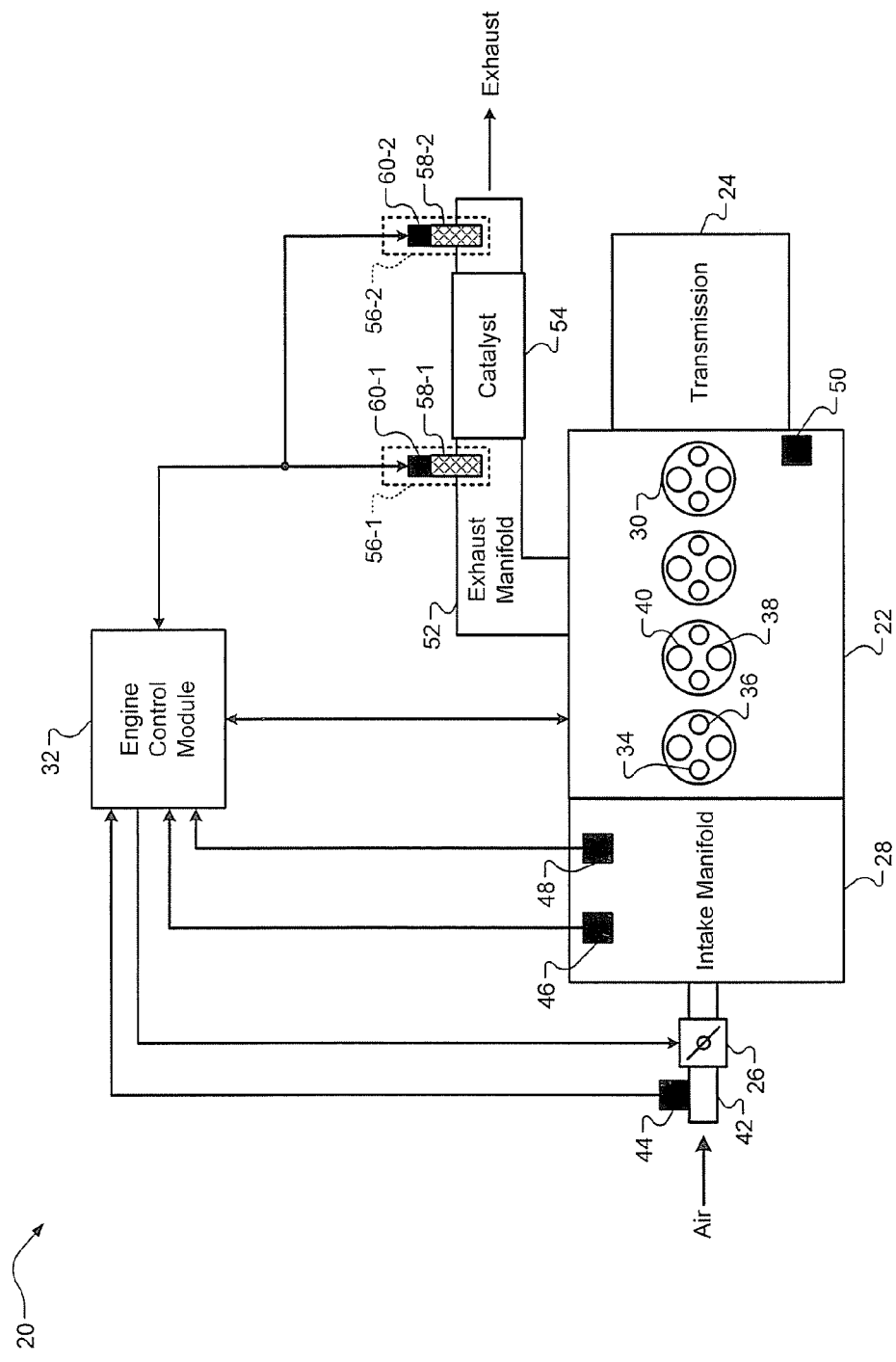
FIG. 1 is a functional block diagram of a vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

An oxygen sensor includes a sensor element and a heating element. The sensor element generates a signal that indicates an amount of oxygen in the exhaust gas. The sensor element may operate effectively at an operating temperature. An engine control module (ECM) may electrically heat the heating element to heat the sensor element to the operating temperature. Additionally, the exhaust gas may heat the sensor element to the operating temperature.

The ECM determines a temperature of the heating element based on a resistance of the heating element. The temperature of the heating element may be equal to the temperature of the sensor element. Accordingly, the ECM may determine when the sensor element reaches the operating temperature based on the resistance of the heating element.

The heating element may be heated by both electrical heating and by the exhaust gas when the ECM is heating the heating element to the operating temperature. Accordingly, the ECM may not determine the temperature of the exhaust gas based on the temperature of the heating element when the heating element is electrically heated. The heating element may be disabled (e.g., not electrically heated by the ECM) when the temperature of the heating element is greater than the operating temperature.

A temperature determination control system and method according to the present disclosure determines the temperature of the heating element when the heating element is disabled. The heating element may be heated by the exhaust gas but not electrically heated when the heating element is disabled. Accordingly, the temperature determination system may determine the temperature of the exhaust gas based on the temperature of the heating element when the heating element is disabled. In other words, the temperature determination system may determine the temperature of the exhaust gas based on the temperature of the heating element when the temperature of the exhaust gas is greater than the operating temperature.

The temperature of the exhaust gas may be greater than the operating temperature when engine misfires result in fuel combustion on a catalyst. Additionally, the temperature of the exhaust gas may be greater than the operating temperature when the engine operates at high loads.

A temperature of the catalyst may exceed a catalyst temperature threshold (e.g. 900-950° C.) when fuel combusts on the catalyst and/or when the engine operates at high loads. The catalyst may be damaged when the temperature of the catalyst is greater than the catalyst temperature threshold.

The temperature determination system may determine when the temperature of the catalyst approaches the catalyst temperature threshold based on the temperature of the exhaust gas (i.e., the temperature of the heating element). Accordingly, the temperature determination system may determine when the catalyst may be damaged due to misfires and/or high load. The temperature determination system may operate the engine (e.g., modulate air intake and fuel injection) to protect the catalyst from damage when the temperature of the exhaust gas indicates that the catalyst may be damaged.

The temperature determination system may determine that the temperature of the catalyst is approaching the catalyst temperature threshold based on the temperature of the exhaust gas as indicated by a heating element upstream and/or downstream from the catalyst. The temperature determination system may detect that the catalyst is approaching the catalyst temperature threshold based on heating of the heating element upstream from the catalyst due to fuel combustion on the catalyst. The temperature determination system may also detect that the catalyst is approaching the catalyst temperature threshold based on heating of the heating element downstream from the catalyst resulting from heating of the exhaust gas passing through the catalyst. Additionally, the temperature determination system may detect that the catalyst is approaching the catalyst temperature threshold based on heating of the heating element upstream and/or downstream from the catalyst due to high load.

Referring now to FIG. 1, an exemplary vehicle system 20 includes an engine 22 that drives a transmission 24. While a spark ignition engine is illustrated, compression ignition engines are also contemplated. An ECM 32 communicates with components of the vehicle system 20. Components of the vehicle system 20 include the engine 22, sensors, and actuators as discussed herein. The ECM 32 may implement the temperature determination control system and method of the present disclosure.

A throttle 26 may regulate airflow into an intake manifold 28. Air within the intake manifold 28 is distributed into cylinders 30. Each cylinder 30 may include a fuel injector 34 for injecting fuel into the cylinder 30. Each cylinder 30 may include a spark plug 36 for igniting the air/fuel mixture. Alternatively, the air/fuel mixture may be ignited by compression in a compression ignition engine. Although FIG. 1 depicts four cylinders 30, the engine 22 may include additional or fewer cylinders 30.

Air is passed from an inlet 42 through a mass airflow (MAF) sensor 44. The MAF sensor 44 generates a MAF signal that may indicate a mass of air flowing into the intake manifold 28. A manifold pressure (MAP) sensor 46 is positioned in the intake manifold 28 between the throttle 26 and the engine 22. The MAP sensor 46 generates a MAP signal that indicates manifold absolute air pressure. An intake air temperature (IAT) sensor 48 located in the intake manifold 28 generates an IAT signal that indicates intake air temperature. An engine crankshaft (not shown) rotates at engine speed or a rate that is proportional to the engine speed. A crankshaft sensor 50 generates a crankshaft position (CSP) signal that may indicate the rotational speed and position of the crankshaft.

An intake valve 38 selectively opens and closes to enable air to enter the cylinder 30. An intake camshaft (not shown) regulates a position of the intake valve 38. A piston (not shown) compresses the air/fuel mixture within the cylinder 30. The ECM 32 actuates a fuel injector 34 to inject fuel into the cylinder 30. The ECM 32 may actuate a spark plug 36 to initiate combustion of the air/fuel mixture, thereby driving the piston in the cylinder 30. The piston drives the crankshaft to produce drive torque. Combustion exhaust within the cylinder 30 is forced out through an exhaust manifold 52 when an exhaust valve 40 is in an open position. An exhaust camshaft (not shown) regulates a position of the exhaust valve 40. Although single intake and exhaust valves 38, 40 are illustrated, the engine 22 may include multiple intake and exhaust valves 38, 40 per cylinder 30. The engine 22 may also provide for an active fuel management system (not shown) that deactivates intake and exhaust valves 38.

The vehicle system 20 includes a catalyst 54 (e.g., a three-way catalyst housed in a catalytic converter) that treats exhaust. The vehicle system 20 may include one or more oxygen sensors 56-1, 56-2 (collectively oxygen sensors 56) installed in the exhaust manifold 52. The oxygen sensor 56-1 is located upstream from the catalyst 54. The oxygen sensor 56-2 is located downstream from the catalyst 54. The oxygen sensors 56 generate oxygen level signals that indicate an amount of oxygen in the exhaust gas. The ECM 32 may determine an efficiency of the catalyst 54 and control the vehicle system 20 based on the oxygen level signals.

The oxygen sensors 56 include sensor elements 58-1, 58-2 (collectively sensor elements 58). The oxygen sensors 56-1, 56-2 include heating elements 60-1, 60-2, respectively. The heating element 60-1 may be referred to as an upstream heating element 60-1. The heating element 60-2 may be referred to as a downstream heating element 60-2. The heating elements 60-1, 60-2 may be referred to collectively as heating elements 60. The heating elements 60-1, 60-2 may have similar functionality. Accordingly, the upstream heating element 60-1 or the downstream heating element 60-2 may be generally referred to as "the heating element 60."

The heating elements 60 heat corresponding sensor elements 58 to the operating temperature. The operating temperature may be a temperature at which the sensor elements 58 operate effectively (e.g., 650° C.). The heating elements 60 may be located in proximity to the sensor elements 58 so that the sensor elements 58 and the heating elements 60 are at approximately the same temperature. The heating elements 60 may be wires that are electrically heated. Accordingly, the ECM 32 may supply a voltage and/or current to the heating elements 60 to heat the heating elements 60 to the operating temperature.

The catalyst 54 may be damaged due to combustion of fuel on the catalyst 54 when the engine 22 misfires. The engine 22 may misfire, for example, when the spark plug 36 malfunctions, when the fuel injector 34 malfunctions, and/or when there is loss of compression in the cylinder 30 due to a leak in the exhaust valve 40.

The ECM 32 may detect misfires based on CSP signals, for example, based on a deceleration of the engine 22. The ECM 32, however, may not detect the mixture of fuel entering the catalyst due to misfires based on CSP signals. Accordingly, the ECM 32 may not determine whether the catalyst 54 may be damaged due to combustion of fuel on the catalyst 54 when misfires are detected.

The temperature of the catalyst 54 may increase above the catalyst temperature threshold when the exhaust gas entering the catalyst 54 includes unburned hydrocarbons that combust on the catalyst 54. For example, the catalyst 54 may be damaged (e.g., melt) when the catalyst 54 receives the unburned hydrocarbons. The temperature determination control system and method of the present disclosure may determine when the temperature of the catalyst 54 approaches the catalyst temperature threshold. Accordingly, the temperature determination control system and method may determine when the catalyst is overheating due to misfires and/or high load.

The oxygen sensors 56 may be located in proximity to the catalyst 54. Accordingly, the heating elements 60 may be heated by the catalyst 54. The upstream heating element 60-1 may be heated by the exhaust gas entering the catalyst 54. Additionally, the upstream heating element 60-1 may be heated by combustion of fuel on the catalyst 54. For example, the combustion of fuel on the catalyst 54 may warm the exhaust gas upstream from the catalyst 54. Additionally, the combustion of fuel may progress slightly upstream from the catalyst 54, further heating the heating element 60-1.

The downstream heating element 60-2 may be heated by exhaust gas and combustion events in the catalyst 54. Exhaust gas flowing through the catalyst 54 may be heated to the temperature of the catalyst 54. Accordingly, the temperature of the heating element 60-2 may indicate the temperature of the catalyst 54.

Figure 2:
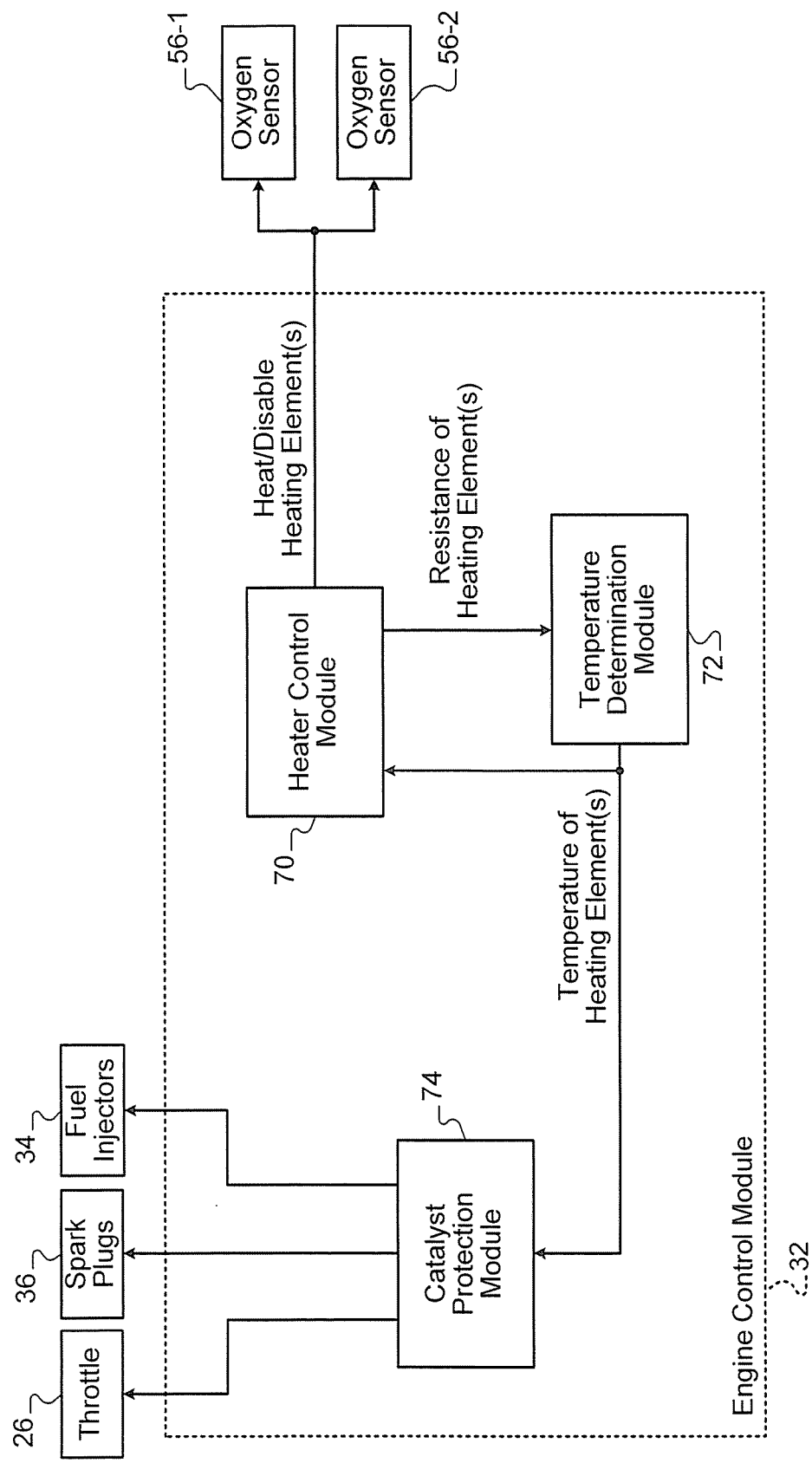
FIG. 2 is a functional block diagram of an engine control module according to the present disclosure.

Referring now to FIG. 2, the ECM 32 includes a heater control module 70, a temperature determination module 72, and a catalyst protection module 74. The ECM 32 receives input signals from the vehicle system 20. The input signals may include, but are not limited to, the MAF, MAP, IAT, CSP, and oxygen level signals. The ECM 32 processes the input signals and generates timed engine control commands that are output to the vehicle system 20. For example, engine control commands may actuate the throttle 26, the fuel injectors 34, the spark plugs 36, and the heating elements 60.

The heater control module 70 may heat the heating element 60 to the operating temperature. The heater control module 70 may not heat the heating element 60 when the temperature of the heating element 60 is greater than the operating temperature. The temperature determination module 72 determines the temperature of the heating element 60 when the temperature of the heating element 60 is greater than the operating temperature. The catalyst protection module 74 determines the temperature of the exhaust gas based on the temperature of the heating element 60.

The catalyst protection module 74 determines when the catalyst 54 may be damaged based on the temperature of the heating element 60. The catalyst protection module 74 may modify operation of the vehicle system 20 to protect the catalyst 54 when the temperature of heating element 60 indicates that the temperature of catalyst 54 is approaching a catalyst temperature threshold. In other words, the catalyst protection module 74 may modify operation of the vehicle system 20 when the temperature of the heating element 60 indicates that the catalyst 54 may be damaged.

The heater control module 70 heats the heating element 60 when the temperature of the heating element 60 is less than the operating temperature. The heater control module 70 may apply a predetermined voltage and/or current to the heating element 60 to heat the heating element 60. Accordingly, the heater control module 70 may determine the resistance of the heating element 60 based on the voltage and current applied to the heating element 60. For example, the heater control module 70 may determine the resistance of the heating element 60 by dividing the voltage applied to the heating element 60 by the amount of current supplied to the heating element 60.

In some implementations, the heater control module 70 may apply pulses of voltage and/or current to the heating element 60 to heat the heating element 60. The heater control module 70 may change a duty cycle of the pulses to control the temperature of the heating element 60 when the heater control module 70 uses pulses to heat the heating element 60. For example, increasing the duty cycle of the pulses may increase the temperature of the heating element 60, while decreasing the duty cycle of the pulses may allow the temperature of the heating element 60 to follow the temperature of the exhaust gas.

The temperature determination module 72 may determine the temperature of the heating element 60 when the heater control module 70 is heating the heating element 60. The temperature determination module 72 may determine the temperature of the heating element 60 based on the resistance of the heating element 60. For example, the temperature determination module 72 may use a look-up table to match the resistance of the heating element 60 to the temperature of the heating element 60.

The temperature determination module 72 determines when the heating element 60, and accordingly the sensor element 58, is heated to the operating temperature. The heating element 60 may be heated by the exhaust gas and the heater control module 70 when the temperature of the heating element 60 is less than the operating temperature. Accordingly, when the temperature of the heating element 60 is less than the operating temperature, the temperature determination module 72 may not determine the temperature of the exhaust gas since the heating element 60 is also heated by the heater control module 70. In other words, the temperature determination module 72 may not distinguish between heating due to electrical heating of the heating element 60 and heating due to the exhaust gas.

The heater control module 70 may disable the heating element 60 when the heating element 60 reaches the operating temperature. The heater control module 70 may not heat the heating element 60 when the heater control module 70 disables the heating element 60. Accordingly, the heating element 60 may not be electrically heated when the heating element 60 reaches the operating temperature. The heater control module 70 may disable the heating element 60 by limiting the amount of current and voltage supplied to the heating element 60. For example, the heater control module 70 may supply a low power to the heating element 60 to disable the heating element 60. The heater control module 70 may also disable the heating element 60 by supplying no power to the heating element 60. In some implementations, the heater control module 70 may decrease a duty cycle of pulses used to heat the heating element 60 to disable the heating element 60. The decreased duty cycle may not heat the heating element 60.

The temperature determination module 72 determines the temperature of the heating element 60 based on the resistance of the heating element 60 when the heating element 60 is disabled. For example, the temperature determination module 72 may determine the temperature of the heating element 60 using a look-up table that relates the resistance of the heating element 60 to a range of temperatures that are greater than the operating temperature.

The heater control module 70 may determine the resistance of the heating element 60 without significantly heating the heating element 60 when the heating element 60 is disabled. For example, the heater control module 70 may determine the resistance of the heating element 60 when supplying the low power to the heating element 60. In some implementations, the heater control module 70 may determine the resistance of the heating element 60 when the heater control module 70 is applying the pulses having the decreased duty cycle to the heating element 60.

The heating element 60 is heated by the exhaust gas when the heating element 60 is disabled. The temperature of the heating element 60 may be equal to the temperature of the exhaust gas when the heating element 60 is disabled. Accordingly, the temperature determination module 72 may determine the temperature of the exhaust gas based on the temperature of the heating element 60 when the heating element 60 is disabled. For example, the temperature determination module 72 may determine that the temperature of the exhaust gas is equal to the temperature of the heating element 60 when the heating element 60 is disabled.

The temperature of the catalyst 54 may approach or exceed the catalyst temperature threshold due to misfire events in the engine 22. The catalyst protection module 74 may determine that misfire events are heating the catalyst 54 based on the temperature of the upstream and/or downstream heating elements 60-1, 60-2.

The temperature of the catalyst 54 may also approach or exceed the catalyst temperature threshold due to an increase in the temperature of the exhaust gas during increased loading on the engine 22. The temperature of the catalyst 54 may increase to a temperature that is greater than or equal to the catalyst temperature threshold when the catalyst 54 is heated due increased load. The catalyst protection module 74 may determine that increased loading on the engine 22 is heating the catalyst 54 based on the temperature of the upstream and/or downstream heating elements 60-1, 60-2.

The catalyst 54 may be damaged when the catalyst 54 reaches the catalyst temperature threshold. For example, portions of the catalyst 54 may melt and break away from the catalyst 54 when the catalyst 54 reaches the catalyst temperature threshold. The catalyst protection module 74 may determine when the temperature of the catalyst 54 is approaching, or exceeding, the catalyst temperature threshold based on the temperature of the upstream and/or downstream heating elements 60-1, 60-2. Accordingly, the catalyst protection module 74 may modify operation of the engine 22 to decrease the temperature of the catalyst 54 when the temperature of the catalyst is approaching, or exceeding, the catalyst temperature threshold.

The catalyst protection module 74 may determine that the temperature of the catalyst 54 is approaching the catalyst temperature threshold based on the temperature of the heating elements 60. For example, the catalyst protection module 74 may determine that the temperature of the catalyst 54 is approaching the catalyst temperature threshold when the temperature of the upstream and/or downstream heating element 60-1, 60-2 is greater than the operating temperature but less than the catalyst temperature threshold (e.g., greater than 800° C.). The catalyst protection module 74 may determine that the temperature of the catalyst 54 is exceeding the catalyst temperature threshold when the temperature of upstream and/or downstream heating element 60-1, 60-2 is greater than the catalyst temperature threshold.

The catalyst protection module 74 may also determine that the temperature of the catalyst 54 is approaching the catalyst temperature threshold based on a rate of change of the temperature of the exhaust gas. For example, when the temperature of the exhaust gas increases at a rate that is greater than a predetermined rate, the catalyst protection module 74 may determine that the temperature of the catalyst 54 is approaching the catalyst temperature threshold.

The catalyst protection module 74 may adjust operating parameters of the engine 22 (e.g., actuate the fuel injectors 34 and throttle 26) to reduce the temperature of the catalyst 54 and/or the exhaust gas when the temperature of the catalyst 54 approaches the catalyst temperature threshold. For example, the catalyst protection module 74 may actuate the fuel injectors 34 and the throttle 26 to reduce an amount of combustion on the catalyst 54 when the temperature of the catalyst 54 approaches the catalyst temperature threshold due to misfires of the engine 22. The catalyst protection module 74 may also actuate the fuel injectors 34 and the throttle 26 to reduce the temperature of the exhaust gas when the temperature of the catalyst 54 approaches the catalyst temperature threshold due to increased engine loading.

In some implementations, the catalyst protection module 74 may determine that the temperature of the catalyst 54 is approaching the catalyst temperature threshold based on the temperature of the exhaust gas downstream from the catalyst 54. Accordingly, the catalyst protection module 74 may determine that the catalyst 54 is approaching the catalyst temperature threshold based on the resistance of the heating element 60-2 downstream from the catalyst 54. When the catalyst 54 is heating due to a misfire in the engine 22, the exhaust gas passing through the catalyst 54 may be heated. Accordingly, the catalyst protection module 74 may determine that the temperature of the catalyst 54 is approaching the catalyst temperature threshold when the temperature of the exhaust gas downstream from the catalyst 54 is approaching the catalyst temperature threshold. For example, the catalyst protection module 74 may determine that the temperature of the catalyst 54 is approaching the catalyst temperature threshold when the temperature of the exhaust gas downstream from the catalyst 54 is within a threshold temperature (e.g., 100° C.) of the catalyst temperature threshold.

In other implementations, the catalyst protection module 74 may determine that the temperature of the catalyst 54 is approaching the catalyst temperature threshold based on the temperature of the exhaust gas upstream from the catalyst 54. Accordingly, the catalyst protection module 74 may determine that the temperature of the catalyst 54 is approaching the catalyst temperature threshold based on the resistance of the upstream heating element 60-1.

When the catalyst 54 is heating due to a misfire in the engine 22, the exhaust gas upstream from the catalyst 54 and/or the upstream heating element 60-1 may be heated. For example, the combustion within the catalyst 54 may occur near the upstream side of the catalyst 54 which may heat the upstream heating element 60-1 and/or exhaust gas passing the upstream heating element 60-1. Additionally, fuel may burn upstream from the catalyst 54 when combustion occurs in the catalyst 54, further heating the upstream heating element 60-1. Accordingly, the catalyst protection module 74 may determine that the temperature of the catalyst 54 is approaching the catalyst temperature threshold when the temperature of the heating element 60-1 approaches the catalyst temperature threshold. For example, the catalyst protection module 74 may determine that the temperature of the catalyst 54 is approaching the catalyst temperature threshold when the temperature of the heating element 60-1 is within a threshold temperature of the catalyst temperature threshold.

The catalyst protection module 74 may include calibration data (e.g., a look-up table) that relates the temperature of the upstream heating element 60-1 to the temperature of the catalyst 54 since the temperature of the exhaust gas upstream from the catalyst 54 may not be equal to the temperature of the catalyst 54 during a misfire. For example, the temperature of the catalyst 54 may be greater than the temperature of the heating element 60-1 since exhaust gas may flow past the heating element 60-1 and may cool the heating element when the temperature of the catalyst 54 is approaching the catalyst temperature threshold.

The catalyst protection module 74 may determine that the temperature of the catalyst 54 is approaching the catalyst temperature threshold based on the resistance of both heating elements 60. For example, the upstream heating element 60-1 may not indicate that the temperature of the catalyst 54 is approaching the catalyst temperature threshold while the downstream heating element 60-2 indicates that the temperature of the catalyst 54 is approaching the catalyst temperature threshold. In this case, the catalyst protection module 74 may determine that the catalyst 54 is heating due to a misfire since the exhaust gas may be heated by the catalyst 54 as the exhaust gas is passing through the catalyst 54.

In one scenario, the upstream heating element 60-1 may indicate that the temperature of the catalyst 54 is approaching the catalyst temperature threshold while the downstream heating element 60-2 does not indicate that the temperature of the catalyst 54 is approaching the catalyst temperature threshold. In this scenario, the catalyst protection module 74 may determine that the catalyst 54 is heating due to a misfire that is combusting near the upstream face of the catalyst 54.

An increase in the temperature of the exhaust gas due to increased load on the engine 22 may be detected by either of the heating elements 60 since the exhaust gas at the increased temperature flows past both of the heating elements 60. Accordingly, the catalyst protection module 74 may determine that the temperature of the catalyst 54 is approaching the catalyst temperature threshold due to increased load on the engine 22 based on the resistance of either of the heating elements 60.

Figure 3:
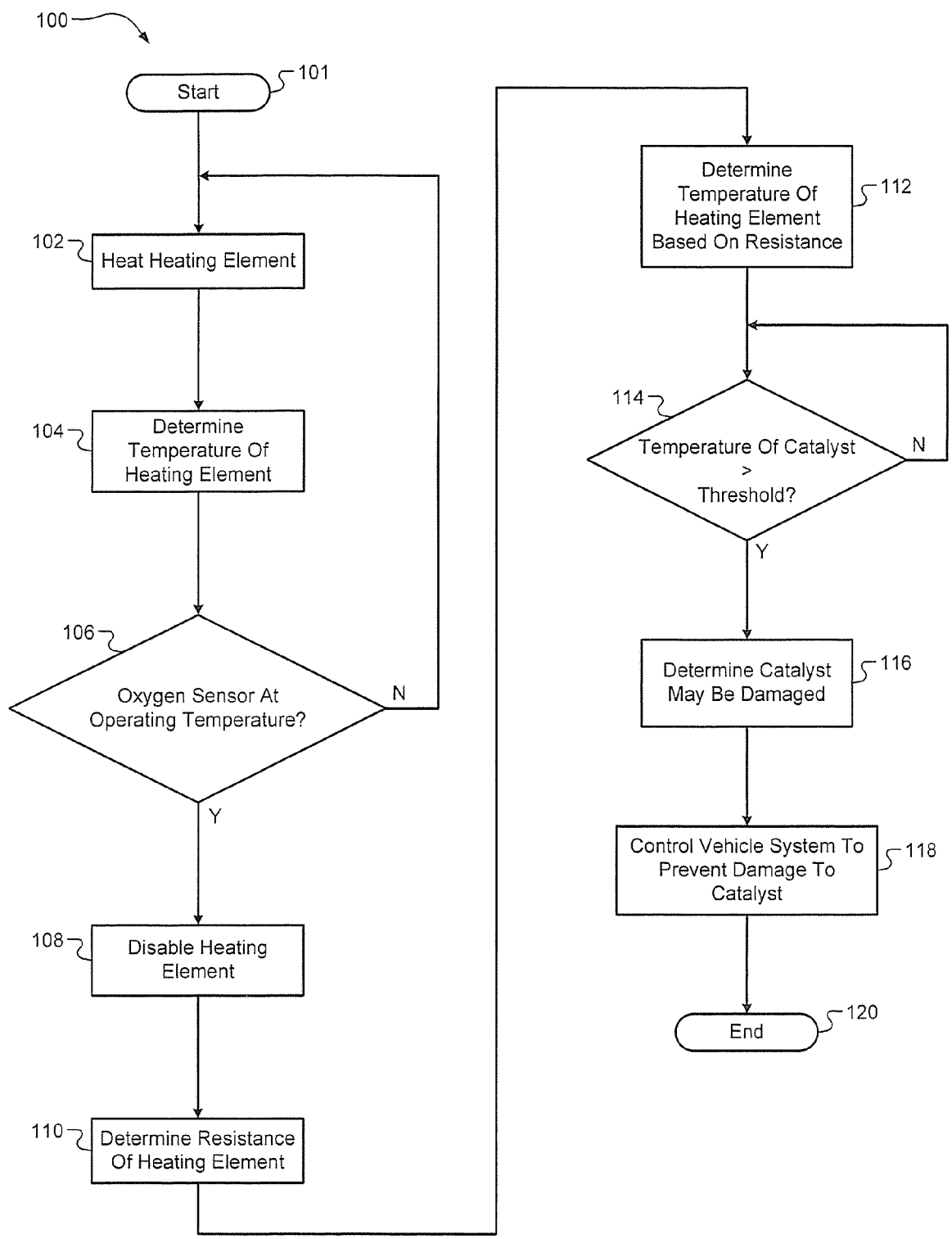
FIG. 3 is a flow diagram that illustrates a method for protecting a catalyst according to the present disclosure.

Referring now to FIG. 3, a method 100 for protecting a catalyst starts in step 101. In step 102, the heater control module 70 heats the heating element 60. In step 104, the temperature determination module 72 determines the temperature of the heating element 60. In step 106, the temperature determination module 72 determines whether the oxygen sensor 56 is at the operating temperature. If the result of step 106 is false, the method 100 repeats step 102. If the result of step 106 is true, the method 100 continues with step 108.

In step 108, the heater control module 70 disables the heating element 60. In step 110, the heater control module 70 determines the resistance of the heating element 60. In step 112, the temperature determination module 72 determines the temperature of the heating element 60 based on the resistance of the heating element 60. In step 114, the catalyst protection module 74 determines whether the temperature of the catalyst 54 is greater than the catalyst temperature threshold. If the result of step 114 is false, the method 100 repeats step 114. If the result of step 114 is true, the method 100 continues with step 116. In step 116, the catalyst protection module 74 determines that the catalyst 54 may be damaged. In step 118, the catalyst protection module 74 controls the vehicle system 20 to prevent damage to the catalyst 54. The method 100 ends in step 120.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
a first electronic circuit configured to:
apply voltage pulses at a first duty cycle to a heating element of an oxygen sensor;
determine a first temperature of the heating element; and
apply voltage pulses, at a second duty cycle, to heat the heating element to a predetermined temperature in response to the first temperature being greater than a first threshold temperature, wherein the first duty cycle is greater than the second duty cycle;
a second electronic circuit configured to determine a temperature of exhaust gas based on a resistance of the heating element and the second duty cycle; and
a third electronic circuit configured to adjust an operating parameter of an engine to decrease the temperature of the exhaust gas when the temperature of the exhaust gas is greater than a second threshold temperature, wherein the second threshold temperature is based on a temperature that damages a catalyst in an exhaust system.

2. The control system of claim 1 wherein the second threshold temperature is greater than 800° C.

3. The control system of claim 1 further comprising the first electronic circuit is further configured to electrically heat the heating element to an operating temperature of the oxygen sensor and that stops electrically heating the heating element when the temperature of the heating element is greater than the operating temperature, wherein the operating temperature is less than the second threshold temperature.

4. The control system of claim 1 wherein the third electronic circuit is further configured to adjust at least one of fuel injection and a position of a throttle to decrease the temperature of the exhaust gas.

5. The control system of claim 1 wherein the third electronic circuit is further configured to determine when combustion events on the catalyst resulting from misfires in the engine are heating the exhaust gas to a temperature that is greater than the second threshold temperature.

6. The control system of claim 5 wherein the third electronic circuit is further configured to adjust the operating parameter of the engine to prevent combustion events on the catalyst.

7. The control system of claim 5 wherein the third electronic circuit is further configured to determine that combustion events on the catalyst resulting from misfires in the engine are heating the exhaust gas based on the resistance of the heating element, wherein the heating element is located downstream from the catalyst.

8. The control system of claim 5 wherein the third electronic circuit is further configured to determine that combustion events on the catalyst resulting from misfires in the engine are heating the exhaust gas based on the resistance of the heating element, wherein the heating element is located upstream from the catalyst.

9. The control system of claim 1 wherein, based on the resistance of the heating element, the third electronic circuit is further configured to determine when heating of the exhaust gas to a temperature that is greater than the second threshold temperature is a result of a load on the engine.

10. The control system of claim 9 wherein the third electronic circuit is further configured to adjust the operating parameter of the engine to decrease the load on the engine.

11. A method comprising:
applying voltage pulses at a first duty cycle to a heating element of an oxygen sensor;
determining a first temperature of the heating element;
applying voltage pulses, at a second duty cycle, to heat the heating element to a predetermined temperature in response to the first temperature being greater than a first threshold temperature, wherein the first duty cycle is greater than the second duty cycle;
determining a temperature of exhaust gas based on a resistance of the heating element and the second duty cycle; and
adjusting an operating parameter of an engine to decrease the temperature of the exhaust gas when the temperature of the exhaust gas is greater than a second threshold temperature, wherein the second threshold temperature is based on a temperature that damages a catalyst in an exhaust system.

12. The method of claim 11 wherein the second threshold temperature is greater than 800° C.

13. The method of claim 11 further comprising:
electrically heating the heating element to an operating temperature of the oxygen sensor: and
stopping electrical heating of the heating element when the temperature of the heating element is greater than the operating temperature, wherein the operating temperature is less than the second threshold temperature.

14. The method of claim 11 further comprising adjusting at least one of fuel injection and a position of a throttle to decrease the temperature of the exhaust gas.

15. The method of claim 11 further comprising determining when combustion events on the catalyst resulting from misfires in the engine are heating the exhaust gas to a temperature that is greater than the second threshold temperature.

16. The method of claim 15 further comprising adjusting the operating parameter of the engine to prevent combustion events on the catalyst.

17. The method of claim 15 further comprising determining that combustion events on the catalyst resulting from misfires in the engine are heating the exhaust gas based on the resistance of the heating element, wherein the heating element is located downstream from the catalyst.

18. The method of claim 15 further comprising determining that combustion events on the catalyst resulting from misfires in the engine are heating the exhaust gas based on the resistance of the heating element, wherein the heating element is located upstream from the catalyst.

19. The method of claim 11 further comprising determining, based on the resistance of the heating element, when heating of the exhaust gas to a temperature that is greater than the second threshold temperature is a result of a load on the engine.

20. The method of claim 19 further comprising adjusting the operating parameter of the engine to decrease the load on the engine.

21. The control system of claim 1 further comprising at least one of an Application Specific Integrated Circuit (ASIC), a processor and memory that execute one or more software or firmware programs, and a combinational logic circuit that includes the first electronic circuit, the second electronic circuit, and the third electronic circuit.

* * * * *